3,032,468
METHOD PARTICULARLY SUITABLE FOR THE PREVENTION OF PARESIS PUERPERALIS IN CATTLE

Evert Jan ten Ham and Johannes Hendrikus Gerardus Wilson, Van Houtenlaan, Netherlands, assignors to North American Philips Company, Inc., New York, N.Y., a corporation of Delaware
No Drawing. Filed Sept. 22, 1958, Ser. No. 762,251
Claims priority, application Netherlands Sept. 23, 1957
5 Claims. (Cl. 167—53)

This invention relates to a composition particularly suitable for use in veterinary medicine and to a method for using that composition in the prevention of paresis puerperalis (milk fever) in cattle.

Paresis puerperalis is a disturbance in the metabolic process which chiefly occurs with cattle after giving birth. The occurrence of this disease is more common with high milk producers so that those cattle that have already calved are more prone to have this disease.

The clinical manifestations of this disease which are generally observed 48 to 72 hours after giving birth are as follows: First the animal is dull and lethargic and may show trembling of the hind quarters. Soon afterward the hindlegs become weak and the animal, after it has lied down, can no longer get up. Finally lack of consciousness occurs, the abdominal muscles practically cease to function which may result in tympany and retention of faeces and urine. There also occurs a decrease in the phosphorus and a considerable decrease in the calcium content of the blood serum.

Efforts to prevent the occurrence of this disease have mainly included the injection of liquids containing calcium salts. However, these means have not proved successful.

Another method that has been employed to prevent this disease is the oral administration of vitamin $D_2$ in the form of irradiated yeast. However this method suffers from the fact that huge doses are required for success, 30,000,000 I.U. (1 S.U. or standard unit=$1 \times 10^6$ I.U.), per day for 7 days before calving, and the difficulties inherent in the oral administration.

A principal object therefore of this invention is to provide a more suitable means of preventing the occurrence of paresis puerperalis in cattle.

A further principal object of this invention is to provide a means against paresis puerperalis that may be parenterally administered.

A still further object of this invention is to provide a means of preventing paresis puerperalis that requires the administration of only one or two doses.

These and other objects of the invention will be apparent from the description that follows.

According to the invention it has been found that aqueous solubilized dispersions of vitamin D in which the vitamin D is solubilized by means of a polyoxyethylene ether or polyoxyethylene ester emulsifying agent are extremely effective in preventing the occurrence of paresis puerperalis in cattle. By the term "aqueous solubilized dispersion" is meant a dispersion in water which is water-clear, does not have any turbidity perceptible to the naked eye and which does not become turbid when diluted with water but which exhibits the Tyndall effect.

Further, according to the invention it has been found that the parenteral administration of the composition of the invention will prevent the occurrence of paresis puerperalis in the great majority of cases.

The novel composition of our invention has the advantage of being so efficient that in the great majority of cases the administration of only a single dose of the novel composition of the invention is sufficient to prevent the occurrence of the disease.

It has been found that effective results are achieved if the solubilized vitamin composition of the invention contains as the emulsifying agent a polyoxyethylene ether or ester of a long chain aliphatic alcohol or acid in which there are present from 10 to 150 oxy-ethylene residues per molecule. Among the most useful of these emulsifying agents are the water soluble polyoxyethylene ethers of long chain aliphatic alcohols containing from 12 to 22 carbon atoms, 10 to 150 oxy-ethylene groups per molecule and a melting point lower than 100° C. and the water soluble polyalkylene oxide derivatives of partial esters of long chain fatty acids containing at least 12 carbon atoms per molecule and a compound selected from the group consisting of the polyhydric alcohols and their anhydrides. Said useful derivatives of the polyesters also contain from 10 to 150 oxyethylene groups per molecule and a melting point not higher than 100° C. Among the many suitable emulsifying agents of the above designated groups are those disclosed in U.S. Patent 2,380,166, U.S. Patent 2,417,299 and U.S. Patent 2,518,230 polyoxyethylene sorbitan monopalmitate, sold under the trademark Tween 40, polyoxyethylene sorbitan tristerate, sold under the trade mark Tween 65, and polyoxyethylene monooleate sold under the trade mark Tween 80. However it has been found that the polyoxyethylene ethers of the glycerine triester of ricinoleic acid containing 20 to 60 ethylene-oxide residues per molecule and particularly the polyoxy-ethylene ether of castor oil containing 40 ethylene-oxide residues per molecule are most effective.

The concentration of vitamin D in the solubilized dispersion may vary from about 0.1 to 3 S.U. per cc. and the concentration of the emulsifying agent may vary from about 10% to 30% by weight per unit-volume, the concentration of the emulsifying agent increasing with the concentration of the vitamin.

It has been found that when administered in the form of the composition of the invention a total of from 6 S.U. to 40 S.U. of the vitamin D is sufficient and that in most cases the administration of from 10 to 20 S.U. of the vitamin D is sufficient. In order to reduce the amount of liquid that must be administered it has been found preferable to use a fairly high concentration of the vitamin D i.e., 0.8 to 1.55 S.U., and in the majority of cases 1 to 1.25 S.U., of vitamin D per cc. In order to ensure that the vitamin D is fully solubilized it is preferred to use at least 20%–25% by weight based on the unit-volume of the emulsifying agent. However, a concentration of 30% by weight per unit-volume of the emulsifying agent has been found to be sufficient in all cases.

While either of vitamin $D_2$ and $D_3$ may be employed most satisfactory results have been achieved with the use of vitamin $D_3$. Also it is preferred to employ the crystalline vitamin as this is the most easily solubilized.

The composition of the invention should be administered to pregnant cattle at most 10 days before giving birth and preferably from 2 to 8 days before giving birth, as a rule a larger quantity of the vitamin D is administered as the period of time between the administration and calving increases. If birth does not take place within 8 days of the administration of the composition a second dose of the same strength should be immediately administered.

The parenteral administration may be carried out in many ways, one of the most satisfactory being by injection into a vein of the animal.

In order that the invention may be readily carried out it will be described with reference to the following example and table:

1100 S.U. of crystalline vitamin $D_3$ were gently heated at a temperature of about 60° C. and at this temperature, whilst stirring, dissolved in 275 gms. of a polyoxyethylene ether of ricinic oil, containing about 40–60 oxyethylene groups. After the mixture had become homogenous it was diluted gradually with 500 cm.³ of water suitable for injection having a temperature of 45–50° C. and in which 5 gms. of $Na_2HPO_4.2H_2O$ and 1 gm. of citric acid was dissolved. Under control of an electrical pH measurement apparatus the pH of the dispersion was determined and adjusted to a value of 6.9–7.1 by careful addition of some drips of 4 n hydrochloric acid. After cooling to room temperature the solution was brought to a volume of 1 l. exactly by addition of water suitable for injection. Stirring followed till a homogeneous liquid was obtained, whereafter the dispersion was filtered through a sintered glass filter (Jena G2). Injection flasks were completely filled with the solution, closed by rubber hoods and sealed with aluminium flanging capsulae. The filled bottles were sterilized by keeping in streaming water damp of 100° C. during one hour. After sterilisation the bottles were rotated until the contents were cooled to about 40° C.

*Example*

1000 S.U. of crystalline vitamin $D_3$ was mixed with 260 grams of the reaction product of castor oil and polyoxyethylene containing about 40 polyoxyethylene groups per molecule. The mixture was dispersed in 1000 cc. of distilled water by means of a blending apparatus until the dispersion was water clear and did not show any turbidity to the naked eye. 8 days before calving, 10 cc. of this dispersion were injected intraveneously into pregnant cows having a history of milk fever (paresis puerperalis). The effects on these treated cows were compared with that of untreated pregnant cows chosen from the same herd and also all of whom had a history of milk fever. The results of these tests are shown in the following table:

| | No. of Treated Animals | No. of Untreated Animals | No. of Treated Animals Effected by Milk Fever | Percent Treated Animals effected | No. of Untreated Animals Effected | Percent of Untreated Animals effected |
|---|---|---|---|---|---|---|
| Test A | 43 | 13 | 4 | 9.3 | 11 | 84.6 |
| Test B | 39 | 18 | 6 (1 light case) | 15.4 | 18 (2 light cases) | 100 |

While we have described our invention in connection with specific embodiments and applications, other modifications thereof will be readily apparent to those skilled in this art without departing from the spirit and scope of the invention as defined in the appended claims.

What is claimed is:

1. A method of preventing the occurrence of paresis puerperalis in pregnant cattle comprising parenterally administering to said cattle 8 to 2 days before giving birth, 10 to 20 S.U. of vitamin D in the form of a composition consisting essentially of an aqueous dispersion of a vitamin D and an emulsifying agent consisting essentially of a polyoxyethylene ether, containing from about 40 to 60 oxyethylene residues per molecule, of the triester of glycerin and ricinoleic acid, said dispersion containing from 1 to 1.2 S.U. of the vitamin per cc. and about 25%–30% by weight of the emulsifying agent per cc. and said dispersion being water clear without any turbidity perceptible to the naked eye even when diluted with water but exhibiting the Tyndall effect.

2. A method of preventing the occurrence of paresis puerperalis in pregnant cattle comprising parenterally administering to said cattle 8 to 2 days before giving birth, 10 to 20 S.U. of vitamin D in the form of a composition consisting essentially of an aqueous dispersion of crystalline vitamin $D_3$ and an emulsifying agent consisting essentially of a polyoxyethylene ether, containing about 40 oxyethylene residues per molecule of castor oil, said dispersion containing from 1 to 1.2 S.U. of the vitamin per cc. and about 25%–30% by weight of the emulsifying agent per cc., said dispersion being water clear without any turbidity perceptible to the naked eye even when diluted with water but exhibiting the Tyndall effect.

3. The method of claim 2 in which the composition is administered by an intraveneous injection.

4. A method of preventing the occurrence of paresis puerperalis in pregnant cattle comprising parenterally administering to said cattle at most 10 days before giving birth, 6 to 40 S.U. of vitamin D in the form of a composition consisting essentially of an aqueous dispersion of a vitamin D and an emulsifying agent selected from the group consisting of polyoxyethylene derivatives of partial esters of long chain fatty acids containing at least 12 carbon atoms and a composition selected from the group consisting of polyhydric alcohols and the anhydrides of said alcohols and water soluble polyoxyethylene ethers of long chain aliphatic alcohols containing from about 12 to 22 carbon atoms and having about 10–150 oxyethylene groups per molecule, said emulsifying agent having a melting point below 100° C., said dispersion containing from 0.1 to 3 S.U. of the vitamin per cc. and about 10%–30% by weight of the emulsifying agent per cc., said dispersion being water clear without any turbidity perceptible to the naked eye even when diluted with water but exhibiting the Tyndall effect.

5. The method of claim 4 in which the required amount of the vitamin D is administered by a single parenteral injection.

References Cited in the file of this patent

UNITED STATES PATENTS

| 2,518,230 | Freeman | Aug. 8, 1950 |
| 2,628,930 | Zentner | Feb. 17, 1953 |

OTHER REFERENCES

Hibbs: J. Dairy Science, vol. 38, 1955, pp. 65–72.

Goodman: The Pharmacological Basis of Therapeutics, 2nd edition, 1955, Macmillan Co., New York, N.Y., pp. 6 and 7.

U.S. Dispensatory, 25th edition, 1955, Lippincott Co., Philadelphia, Pa., pp. 2039 to 2041.